United States Patent
Matsuo

(10) Patent No.: US 6,650,395 B2
(45) Date of Patent: Nov. 18, 2003

(54) LIQUID CRYSTAL DEVICE AND ELECTRONIC DEVICE AND METHOD OF MANUFACTURING THE DEVICES

(75) Inventor: Mutsumi Matsuo, Suwa (JP)

(73) Assignee: Seiko Epson Corporation (JP)

(*) Notice: Subject to any disclaimer, the term of this patent is extended or adjusted under 35 U.S.C. 154(b) by 141 days.

(21) Appl. No.: 09/942,264

(22) Filed: Aug. 28, 2001

(65) Prior Publication Data

US 2002/0044241 A1 Apr. 18, 2002

(30) Foreign Application Priority Data

Aug. 28, 2000 (JP) .................................. 2000-257890

(51) Int. Cl.$^7$ ............................................. G02F 1/1333
(52) U.S. Cl. ........................ 349/158; 349/67; 349/113; 349/160
(58) Field of Search ........................... 349/67, 113, 158, 349/160

(56) References Cited

U.S. PATENT DOCUMENTS 4,693,559 A * 9/1987 Baeger ..................... 349/160
5,724,111 A * 3/1998 Mizobata et al. .......... 349/112
6,061,112 A * 5/2000 Ukita et al. ............... 349/113
6,331,882 B1 * 12/2001 Shimodaira et al. ....... 349/122

FOREIGN PATENT DOCUMENTS

| JP | 54-037697 | 3/1979 |
| JP | 8-160464 | 6/1996 |
| JP | 2000-066198 | 3/2000 |
| JP | 2000-193959 | 7/2000 |

* cited by examiner

*Primary Examiner*—Eddie Lee
*Assistant Examiner*—N. Drew Richards
(74) *Attorney, Agent, or Firm*—Harness, Dickey & Pierce, P.L.C.

(57) ABSTRACT

The total thickness of a reflecting layer 12, colored layers 13 and a protecting layer 14 formed on a roughened surface area 11$a$ of a reflecting substrate 10 is larger than a step difference $\Delta d$ between the roughened surface area 11$a$ and a flat surface area 11$b$ so that the surface of the roughened surface area 11$a$ of the reflecting substrate 10 is lower than the surface of the flat surface area 11$b$.

22 Claims, 10 Drawing Sheets

LIQUID CRYSTAL DEVICE AND ELECTRONIC DEVICE AND METHOD OF MANUFACTURING THE DEVICES

BACKGROUND OF THE INVENTION

1. Technical Field of the Invention

The present invention relates to a liquid crystal device, an electronic device and a method of manufacturing the liquid crystal device, and more specifically, the present invention relates to the structure of a liquid crystal device comprising a reflecting layer provided on one of two substrates which constitute the liquid crystal device.

2. Description of the Related Art

A reflective liquid crystal display device is conventionally widely used, in which a display can be visualized by using external light. This reflective liquid crystal display device eliminates the need for a light source such as a back light or the like, and thus has the advantage that the power consumption can be decreased, and the size and weight can easily be decreased, as compared with a transmissive liquid crystal display device. Therefore, the reflective liquid crystal display device is widely used for portable devices, etc. Also, a transflective liquid crystal display device which can be used as a reflective liquid crystal display device with external light, and which can visualize a display by using light of a back light in the dark, and a liquid crystal display device with a front light which can visualize a display by using light from the front light have been developed.

The reflective or transflective liquid crystal display device or the liquid crystal display device with a front light comprises a reflecting layer provided under a liquid crystal layer, for reflecting light incident from the observation side. In this case, the reflecting layer having a mirror plane as a reflecting plane causes reflection of a background, and room illumination, etc., thereby causing the problem of making a display image hard to see. In order to solve this problem, a method is conventionally used, in which a surface of the reflecting layer is roughened to appropriately scatter reflected light.

As a conventionally used method for roughening the surface of the reflecting layer, for example, a roughening method for roughening a surface of the reflecting layer is known, in which the substrate surface is polished and roughened by an abrasive and a metal film is formed on the roughened surface.

However, in a liquid crystal device comprising a reflecting layer having the conventional roughened surface, a surface of a substrate is totally roughened, and alignment marks, switching elements, a sealing material, etc., which should be formed on a flat surface of a substrate, are inevitably formed on the roughened surface of the substrate, thereby causing the problem of deteriorating mark visibility, or causing a defect in the operation of the switching elements, a defect in sealing, or the like.

Also, the surface of the reflecting layer is regularly roughened to produce interference in reflected light, thereby causing the problem of coloring an image. Ideally, the surface of the reflecting layer is irregularly roughened to form an irregularly roughened surface. However, it is very difficult to finely control the state of surface roughness in order to form the irregularly roughened surface.

A possible method for solving the above problem comprises etching or chemically polishing a portion of the surface of a substrate to form an irregularly roughened surface. However, in such partial chemical processing of the surface of the substrate, the roughened surface area (referred to as a "roughened surface area" hereinafter) is recessed, as compared with a flat surface area (referred to as a "flat surface area" hereinafter). Therefore, in dispersing a spacer for regulating a cell gap between two substrate, the spacer extends to the flat surface area or mixes with a sealing material to increase the cell gap in the periphery of a liquid crystal display area. This possibly causes a variation in display contrast, or the like due to nonuniformity in the cell gap.

Accordingly, the present invention has been achieved for solving the above problem, and an object of the present invention is to provide a liquid crystal device comprising a reflecting layer having a conventional roughened reflecting plane, and a novel cell structure capable of decreasing an optical defect and a defect in the cell structure due to the roughened reflecting plane.

SUMMARY OF THE INVENTION

A liquid crystal device of the present invention comprises a liquid crystal sandwiched between two substrates, a roughened surface area and a flat surface area which are formed on a surface of one of the substrates opposite to the other substrate, and a reflecting layer formed on the roughened surface area, wherein the reference plane of the roughened surface area is lower than the surface of the flat surface area.

Particularly, in the present invention, the total thickness of a surface structure selectively formed on the roughened surface area of one of the substrates and a surface structure selectively formed on the area of the other substrate opposite the roughened surface area is equivalent to or larger than the step difference between the reference plane height of the roughened surface area and the surface height of the flat surface area.

The terms "selectively formed on the roughened surface area" mean substantially no formation on the flat surface area, and the terms "selectively formed on the area of the substrate opposite to the roughened surface area" mean substantially no formation on the region opposite to the flat surface region.

In the present invention, the reference plane of the roughened surface area is lower than the surface of the flat surface area, but the total of the thickness of the surface structure selectively formed on the roughened surface area of one of the substrates and the thickness of the surface structure selectively formed on the area of the other substrate opposite the roughened surface area is equivalent to or larger than the step difference between the roughened surface area and the flat surface area. Therefore, the distance between the substrates in the roughened surface area comprising the reflecting layer can be made equivalent to or smaller than that in the flat surface area.

Therefore, in regulating the space between both substrates by control means such as a spacer or the like, the distance between the substrates in the roughened surface area can be accurately regulated by the control means, and thus an optical function portion comprising the reflecting layer having a roughened surface can be precisely formed. In this case, the step difference between the reference plane height of the roughened surface area and the surface height of the flat surface area can be freely set to some extent, thereby permitting the preferred roughness state of the roughened surface area to be easily formed without great restriction.

In the present invention, the total of the thickness of the surface structure selectively formed on the roughened surface area of one of the substrates and the thickness of the surface structure selectively formed on the area of the other substrate opposite the roughened surface area is preferably larger than the step difference between the roughened surface area and the flat surface area.

As another aspect of the present invention, a liquid crystal device comprises a predetermined surface structure formed on one of two substrates, wherein the surface height of the substrate including the surface structure in the roughened surface area is equivalent to or larger than that in the flat surface area. In this case, the surface of the substrate including the surface structure in the roughened surface area is preferably higher than that in the flat surface area.

As a further aspect of the present invention, a liquid crystal device comprises a colored layer and a protecting layer laminated in turn on a reflecting layer, or an insulating layer formed on the reflecting layer, wherein the total thickness of the reflecting layer, the colored layer and the protecting layer, or the total thickness of the reflecting layer and the insulating layer is equivalent to or larger than the step difference between the reference plane height of the roughened surface area and the surface height of the flat surface area. In this case, the total thickness of the layers is preferably larger than the step difference between the reference plane height of the roughened surface area and the surface height of the flat surface area.

In the present invention, the two substrates are bonded together through a sealing material, and regulation means is arranged inboard of the sealing material, for regulating the distance between the substrates. The regulation dimension of the regulation means is preferably smaller than the thickness of the sealing material. Since the regulation dimension of the regulation means is smaller than the thickness of the sealing material, the influence of the regulation dimension of the regulation means on the thickness of the sealing material can be decreased even when the regulation means is arranged on the flat surface area or arranged inside the sealing material, thereby decreasing a variation in the distance between the substrates.

In the present invention, another regulation means is provided within the sealing material for regulating the thickness of the sealing material. By regulating the thickness of the sealing material by the other regulation means, the distance between the substrates can be made uniform with high precision over the entire liquid crystal device. In this case, the regulation dimension of the regulation means provided inboard of the sealing material is smaller than the regulation dimension of the other regulation means provided within the sealing material.

The regulation means and the other regulation means comprise a spherical or cylindrical spacer having an outer diameter for determining the regulation dimension.

As a further aspect of the present invention, a liquid crystal device comprises two substrates bonded together with a sealing material provided therebetween, and a liquid crystal arranged inside the sealing material, wherein a roughened surface area and a flat surface area are formed on a surface of one of the substrates opposite to the other substrate so that the reference plane of the roughened surface area is lower than the surface of the flat surface area, a reflecting layer is formed on the roughened surface area, the sealing material is arranged on the flat surface area, and the thickness of the sealing material is equivalent to or larger than the thickness of the liquid crystal layer in the roughened surface area. In this case, the thickness of the sealing material is preferably larger than the thickness of the liquid crystal layer in the roughened surface area.

In the present invention, regulation means is arranged inboard of the sealing material, for regulating the distance between the substrates, and the regulation dimension of the regulation means is preferably smaller than the thickness of the sealing material. In this case, another regulation means is preferably provided within the sealing material, for regulating the thickness of the sealing material.

An electronic device comprises any one of the above-described liquid crystal devices preferably serving as display means. Particularly, since a reflecting or transflective liquid crystal device with low power consumption comprising a reflecting layer can be constructed, an electronic device is preferably a potable electronic device such as a portable information terminal, a portable telephone, a pager, or a portable watch (a wrist watch, a pocket watch, or the like).

A method of manufacturing a liquid crystal device of the present invention comprising a liquid crystal sandwiched between two substrates comprises forming a roughened surface area and a flat surface area on a surface of one of the substrates opposite the other substrate so that the reference plane of the roughened surface area is lower than the surface of the flat surface area, selectively forming a surface structure on the roughened surface area of the one of the substrates and a surface structure on the area of the other substrate opposite the roughened surface area so that the total thickness of the surface structures is equivalent to or lager than the step difference between the reference plane height of the roughened surface area and the surface height of the flat surface area, and then bonding together the two substrates with a sealing material arranged on the flat surface area.

Another method of manufacturing a liquid crystal device of the present invention including a liquid crystal sandwiched between two substrates comprises forming a roughened surface area and a flat surface area on a surface of one of the substrates opposite the other substrate so that the reference plane of the roughened surface area is lower than the surface of the flat surface area, forming a surface structure on each of the roughened surface area of the one of the substrates and the area of the other substrate opposite the roughened surface area, and then bonding together the two substrates with a sealing material arranged on the flat surface area so that the thickness of the sealing material is larger than the thickness of the liquid crystal layer in the roughened surface area.

The present invention preferably comprises the step of covering a portion of the surface of one of the substrates with a mask, roughening the exposed portion of the surface, and then removing the mask to form the roughened surface area and the flat surface area.

The present invention preferably further comprises the step of further processing the roughened surface by another method to change the shape of the surface irregularity in the roughened surface area after the roughening step. This can bring the shape of the surface irregularity of the roughened surface area close to a shape that can realize a reflecting plane having an optically preferable roughness state. In this case, the step of changing the shape of the surface irregularity of the roughened surface area is performed after the mask is removed, thereby decreasing the step difference between the reference plane height of the roughened surface area and the surface height of the flat surface area.

In the present invention, one of the two substrates preferably includes regulation means for regulating the distance between the substrates, and bonded with the other substrate with the sealing material provided therebetween so that the thickness of the sealing material is larger than the regulation dimension of the regulation means.

In the present invention, the sealing material preferably includes another regulation means therein having a regulation dimension larger than the regulation dimension of the above-described regulation means so that the two substrates are bonded together with the thickness of the sealing material regulated by the regulation dimension of the other regulation means.

DETAILED DESCRIPTION OF THE PREFERRED EMBODIMENTS

A liquid crystal device and an electronic device according to embodiments of the present invention will be described in detail below with reference to the attached drawings.

Figure 1:
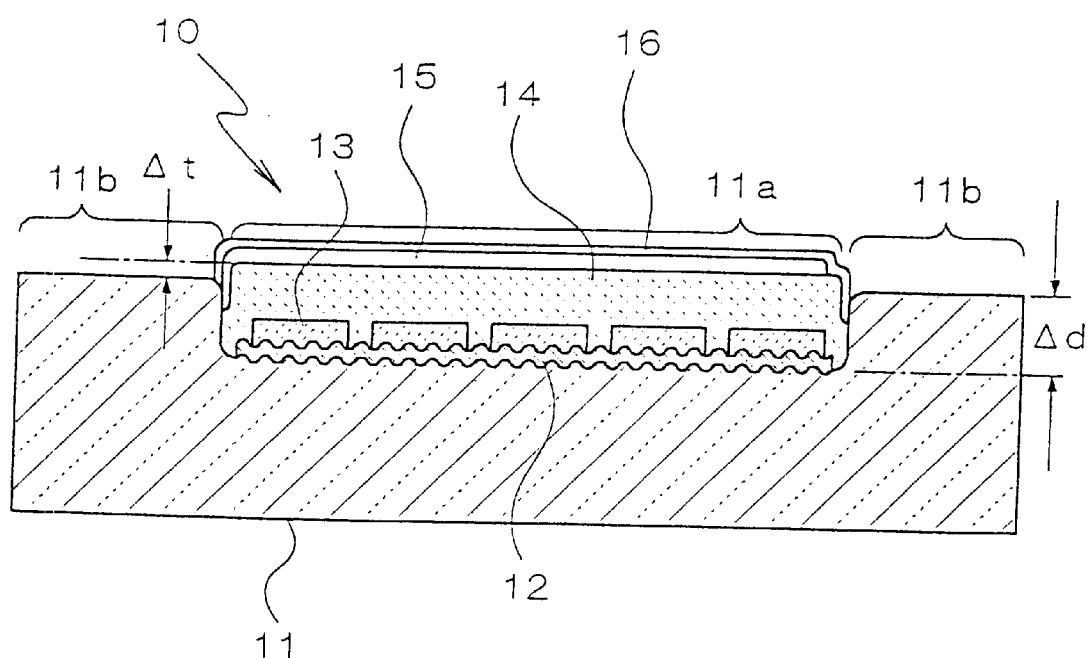
FIG. 1 is a longitudinal sectional view showing the structure of a reflecting substrate of a liquid crystal device according to a first embodiment of the present invention.
Figure 2:
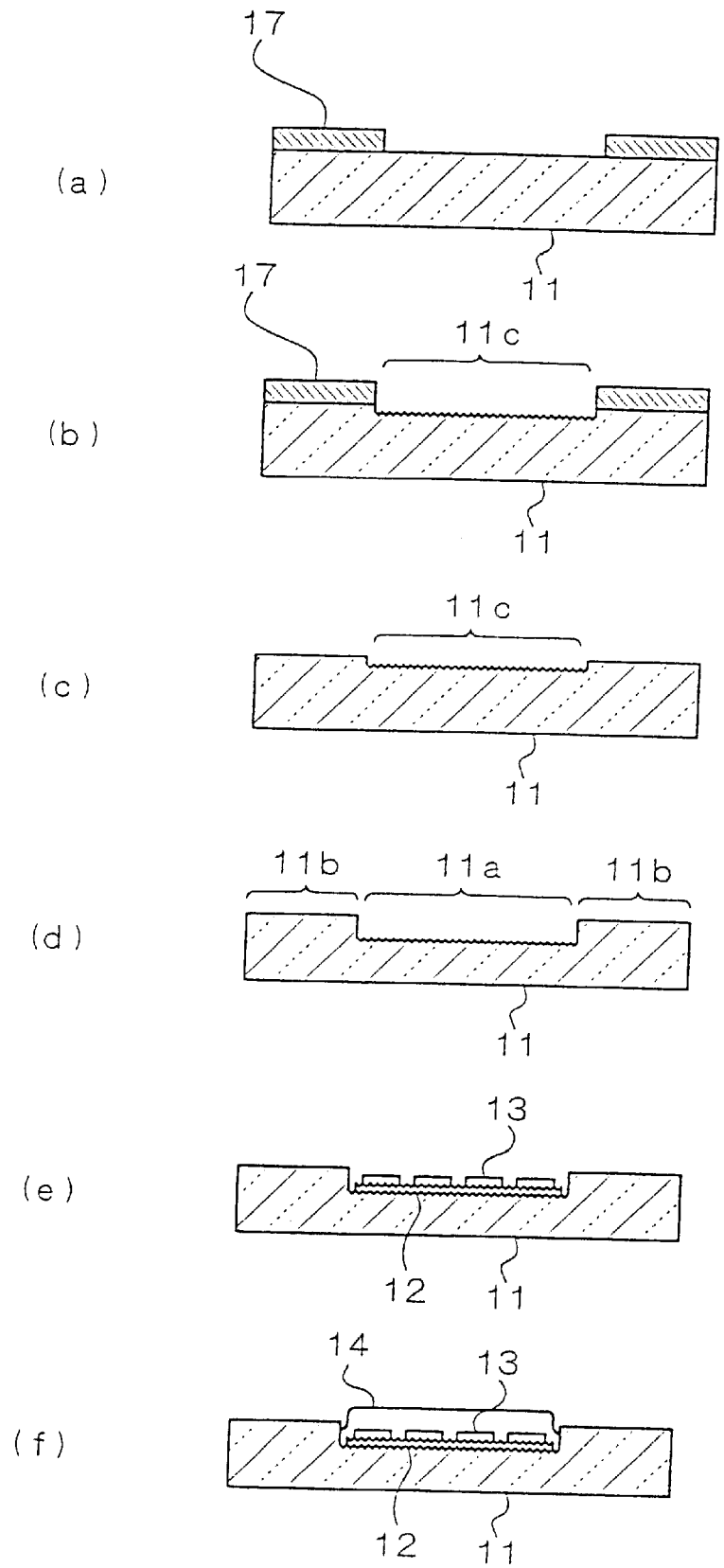
FIGS. 2(a) to (f) are drawings schematically illustrating the steps of a method of manufacturing the reflecting substrate of the first embodiment.
Figure 3:
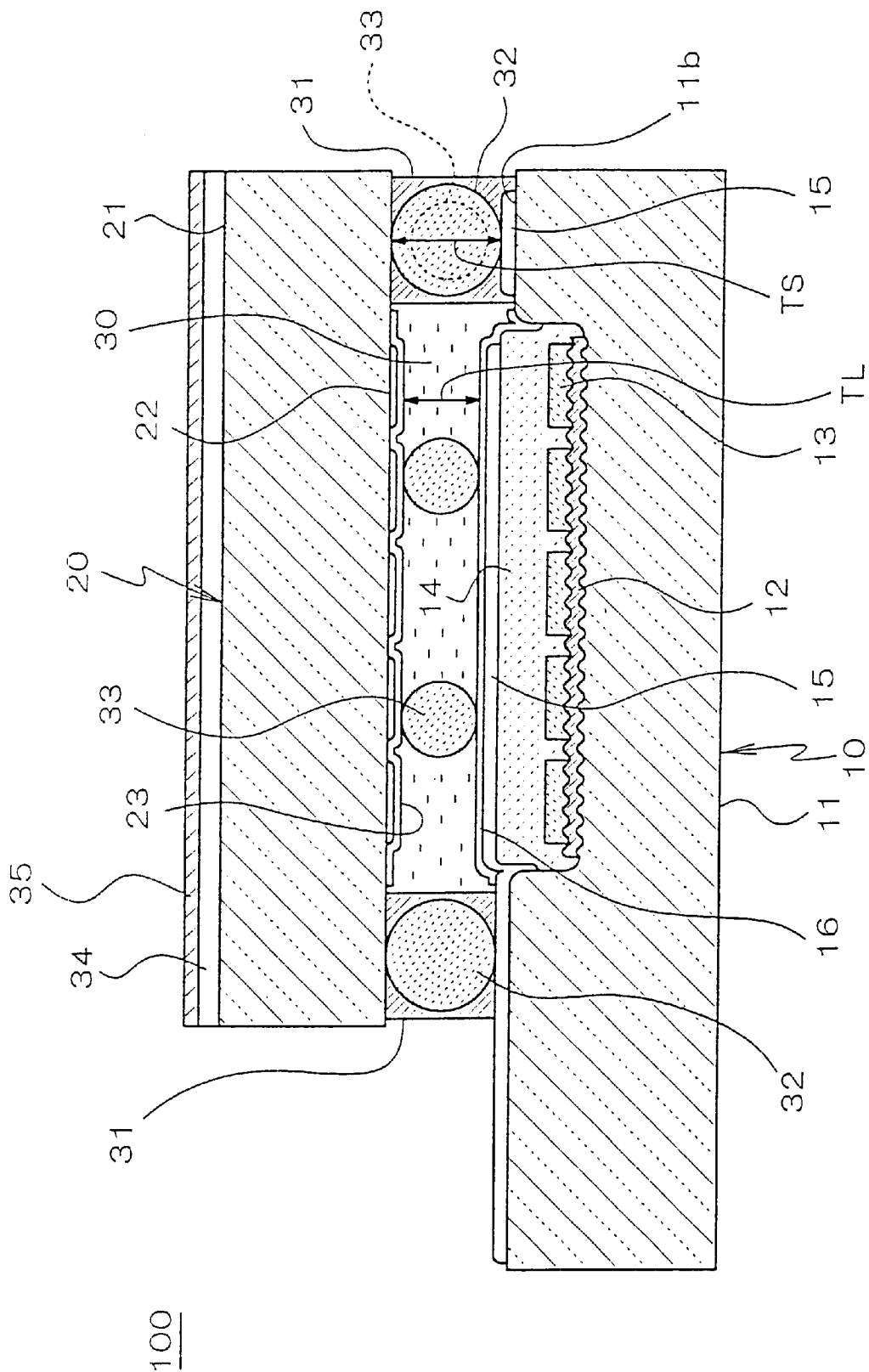
FIG. 3 is a longitudinal sectional view showing the structure of a liquid crystal display panel 100 of the first embodiment.

FIG. 1 is a schematic sectional view schematically showing the structure of a reflecting substrate of a liquid crystal device according to a first embodiment of the present invention, FIG. 2 is a schematic drawing illustrating the steps of a method of producing a reflecting substrate, and FIG. 3 is a schematic sectional view schematically showing a liquid crystal display panel according to the first embodiment.

Referring to FIG. 3, a liquid crystal display panel 100 comprises a reflecting substrate 10 made of glass or the like and a counter substrate 20, which are bonded together through a sealing material 31, and a liquid crystal 30 sealed inside the sealing material 31. The liquid crystal display panel 100 of this embodiment shown in FIG. 3 is a passive matrix reflective color liquid crystal panel as an example.

Referring to FIG. 1, in the reflecting substrate 10, a roughened surface area 11a and a flat surface area 11b are formed on a surface of a substrate material 11 made of glass. For the substrate material 11, for example, soda lime glass, borosilicate glass, barium borosilicate glass, barium aluminosilicate glass, and aluminosilicate glass can be used.

The roughened surface area 11a is formed by optically roughening the surface of the substrate, and the flat surface area 11b has a flatter surface than the roughened surface area 11a. The roughened surface area 11a is formed to be recessed as a whole, as compared with the flat surface area 11b. Namely, the roughened surface area 11a is formed so that the reference height thereof is lower than the surface height of the flat surface area 11b by a step difference $\Delta d$. The roughened surface area 11a comprises a complicated structure formed by fine peaks and troughs for exerting a scattering effect on visible light.

In this embodiment, the reference height of the roughened surface area 11a represents the height of the reference plane obtained by averaging the surface irregularities of the roughened surface area 11a. For example, the reference height is a medium value between the maximum value of the tops of the peaks and the minimum value of the bottoms of the troughs, a simple mean value of height data obtained by sampling the heights of the roughened surface area 11a at predetermined intervals, or the like, and a virtual plane having a statistically typical height of various heights can be considered as the reference plane.

The surface roughness of the roughened surface area 11a can be grasped by using the following plurality of parameters.

(1) Maximum Height Ry

The maximum height Ry is represented by a characteristic amount that indicates a difference in height between the top of the highest peak in the roughened surface area 11a and the bottom of the deepest trough in the same area.

(2) Arithmetic Mean Roughness Ra

The arithmetic mean roughness Ra is represented by a mean value obtained by summing the absolute values of deviations of the measured irregularity line showing the surface shape of the roughened surface area 11a from a predetermined mean line (a virtual line showing the height of the reference plane hereinafter), and then averaging the total.

(3) Ten-Point Mean Roughness Rz

The ten-point mean roughness Rz is represented by the total of a mean value of the peak heights of five peaks selected in order of height from a predetermined mean line and a mean value of the bottom depths of five troughs selected in order of depth form the predetermined mean line.

(4) Mean Wavelength Sm

The mean wavelength Sm is represented by a characteristic amount indicating the mean wavelength of the period of peaks and troughs exceeding a set dead zone having a predetermined width with a predetermined mean line as a medium value. In this embodiment, a height zone having a width of 1% of the maximum height is set as the dead zone for defining the mean wavelength Sm.

Each of the above characteristic amounts is described in detail in JIS (Japanese Industrial Standard) B0601-1994, ISO (International Organization for Standardization) 468-1982, ISO 3274-1975, ISO 4287/1-1984, ISO 4287/2-1984, and ISO 4288-1985.

In this embodiment, the characteristic amount of maximum height Ry is preferably in the range of 0.2 to 3.0 $\mu$m;

arithmetic mean roughness Ra is 0.02 to 0.3 µm; ten-point mean roughness Rz is 0.1 to 2.5 µm; and mean wavelength Sm is 4.0 to 60.0 µm.

The reflecting substrate 10 shown in FIG. 1 comprises a reflecting layer 12 formed on the surface of the roughened surface area 11a by an evaporation or sputtering method using a material such as a single metal such as aluminum, silver, or the like, an alloy composed of aluminum, silver or chromium as a main component, or the like. The surface of the reflecting layer 12, i.e., the reflecting plane, comprises a roughened surface which reflects the shape of the surface irregularities of the roughened surface area 11a.

Furthermore, a resin containing a pigment or dye is coated on the surface of the reflecting layer 12 by a printing method or the like, and then patterned by photolithography to form a colored layer 13 in each of predetermined pixel areas. The colored layer 13 generally comprises a resin material colored any one of R (red), G (green) and B (blue) and arranged in a predetermined pattern. Furthermore, a transparent protecting layer 14 comprising an acrylic resin is formed on the colored layers 13. The protecting layer 14 is formed for protecting the colored layers 13 and eliminating the steps between the respective colored layers 13 to form a flat surface.

As shown in FIG. 3, a plurality of striped transparent electrodes 15 comprising a transparent conductor such as ITO (indium tin oxide) or the like are formed in a parallel arrangement pattern on the surface of the protecting layer 14. An alignment film 16 made of polyimide, polyvinyl alcohol, or the like is formed on the transparent electrodes 15.

In this embodiment, as shown in FIG. 1, the surface of the protecting layer 14 is higher than the surface of the flat surface area 11b of the substrate material 11 by a difference in height Δt. This difference in height Δt can be secured by setting the total thickness of the reflecting layer 12, the colored layers 13 and the protecting layer 14 to be larger than the step difference Δd. Although the difference in height Δt may be 0 or more, from the viewpoint of practical use, it is preferably maintained in a range smaller than the cell gap (corresponding to the thickness of the liquid crystal layer) of the liquid crystal display panel.

FIG. 2 schematically shows an example of the process for manufacturing the reflecting substrate 10. In the manufacturing process, as shown in FIG. 2(a), a resist mask 17 is formed in a predetermined pattern on a portion of the surface of the substrate material 11 by printing, photolithography, or the like to cover a portion of the surface of the substrate. Next, as shown in FIG. 2(b), the surface of the substrate material 11 with the mask 17 formed thereon is etched with an etchant to form a roughened surface 11c in the portion of the surface which is not covered with the mask 17. The roughened surface 11c is formed with predetermined surface roughness according to the chemical correlation between the etchant and the substrate material 11.

Next, as shown in FIG. 2(c), the mask 17 is removed with an alkali aqueous solution or the like. Then, as shown in FIG. 2(d), the entire surface of the substrate material 111 is chemically polished with a polishing solution having an etching ability. In this etching step, the roughened surface 11c becomes the roughened surface area 11a having different surface irregularities, and the surface except the roughened surface area 11a becomes the flat surface area 11b. In this step, the depth of the roughened surface area 11a is larger than the roughened surface 11c to obtain the step difference Δd.

The first roughening step of forming the roughened surface 11c shown in FIG. 2(b) and the second roughening step shown in FIG. 2(d) which is performed by a different method or under different conditions from the first step are carried out in turn to bring the roughened surface area 11a into a desired surface roughness state, i.e., a state having surface roughness having a scattering ability for visible light and having a shape of irregular surface roughness for preventing coloring due to interference or the like. The first roughening step may be performed by a dry etching method, an abrasive processing method such as sand blasting, scribing, or the like instead of wet etching. In this case, the material of the mask is not limited to resist or other resin materials which are adhered to the surface of the substrate, a single-layer resin film or a laminate film which is adhered to the surface of the substrate, or a shielding plate separated from the substrate material may be used. The second roughening step may be performed by simple wet etching instead of chemical polishing. Alternatively the second roughening step may be performed with the mask 17 remaining, without removal of the mask 17 after the first roughening step as described above. An example of each of the steps will be described in detail below.

Next, as shown in FIG. 2(e), the reflecting layer 12 and the colored layers 13 are successively formed. Each of the reflecting layer 12 and the colored layers 13 is generally formed to a thickness in a range previously determined according to light reflection property and coloring property. This is because with the reflecting layer 12 having an excessively small thickness, a sufficient optical reflectance cannot be obtained, while with an excessively large thickness, a roughened surface state of the reflecting plane sufficiently reflecting the surface roughness of the roughened surface area 11a cannot be obtained. With the colored layers 13 having an excessively small thickness, a predetermined color tone cannot be obtained, while with an excessively large thickness, predetermined brightness cannot be obtained.

Next, as shown in FIG. 2(f), the transparent protecting layer 14 is formed. Although, as described above, the protecting layer 14 is formed for protecting the colored layers 13 and obtaining flatness, in this embodiment, the thickness of the protecting layer 14 is appropriately controlled so that the surface of the protecting layer 14 is higher than the surface of the flat surface area 11b, i.e., the total thickness of the reflecting layer 12, the colored layers 13 and the protecting layer 14 is larger than the step difference Δd.

Finally, as shown in FIG. 1, a transparent conductor is coated on the protecting layer 14 by a sputtering process or the like, and then patterned by photolithography to form the stripe transparent electrodes 15. Furthermore, a resist is coated on the transparent electrodes 15, burned to cure the resin, and then rubbed to form the alignment film 16 for defining the initial orientation state of the liquid crystal.

FIG. 3 shows the structure of the liquid crystal display panel 100. The liquid crystal display panel 100 comprises the above-described reflecting substrate 10, and the counter substrate 20, which are bonded together through the sealing material 31, and the liquid crystal 30 injected inside the sealing material.

The counter substrate 20 comprises a substrate material 21 made of the same glass as the substrate material 11 or the like, a transparent electrode 22 made of a transparent conductor such as ITO or the like and formed on the surface of the substrate material 21 opposite to the reflecting substrate 10, and an alignment film 23 formed in the same manner as the alignment film 16 to cover the transparent electrode 22.

The sealing material 31 used for bonding the reflecting substrate 10 and the counter substrate 20 together is arranged on the flat surface area 11b of the reflecting substrate 10. The sealing material 31 contains a plurality of spacers 32 comprising a spherical or cylindrical resin material and having the same outer diameter so that the distance between the reflecting substrate 10 and the counter substrate 20 in the flat surface area 11b is regulated by the outer diameter of the spacers 32.

On the other hand, a plurality of spherical or cylindrical spacers 33 are arranged together with the liquid crystal 30 inboard of the sealing material 31. The spacers 33 are arranged for regulating the distance between the reflecting substrate 10 and the counter substrate 20 in the roughened surface area 11a by using the outer diameter. The outer diameter of the spacers 33 is smaller than that of the spacers 32, and accordingly the distance TS between the reflecting substrate 10 and the counter substrate 20 in the flat surface area 11b is larger than the distance (i.e., the thickness of the liquid crystal 30) TL between the reflecting substrate 10 and the counter substrate 20 in the roughened surface area 11a.

More specifically, the outer diameter of the spacers 32 equals the distance TS, and the outer diameter of the spacers 33 equals the distance TL. Also, the difference between the distances TS and TL substantially equals the difference in height $\Delta t$. In this way, the difference between the outer diameters of the spacers 32 and 33 is caused to correspond to the difference in height $\Delta t$ to secure matching with respect to the thickness dimension of the cell structure.

Description will now be made of a case in which unlike in this embodiment, the distance TL is larger than the distance TS. In this case, in order to secure matching with respect to the thickness dimension of the cell structure, the outer diameter of the spacers 33 must be larger than that of the spacers 32. In this case, the definite arrangement of the spacers 33 on the roughened surface area 11a causes no problem, but the arrangement of the spacers 33 on the flat surface area 11b or mixing with the sealing material 31 increases the distance TS in a portion where the spacers 33 having a large outer diameter are mistakenly arranged. As a result, the cell gap near that portion is increased to cause nonuniformity in the cell gap.

However, in this embodiment, the outer diameter of the spacers 33 is smaller than that of the spacers 32, and thus the distance TS is not increased. Therefore, it is possible to prevent the occurrence of nonuniformity in the cell gap in the periphery of the liquid crystal display region near the forming portion of the sealing material 31.

In fact, as shown in FIG. 3, the transparent electrodes 15 and the alignment film 16 are present on the surface of the protecting layer 14 in the roughened surface area 11a of the reflecting substrate 10, and the transparent electrodes 22 and the alignment film 23 are present on the surface of the substrate material 21 of the counter substrate 20. On the other hand, the transparent electrodes 15 or dummy electrodes 15' formed at the same time as the transparent electrodes 15 are present on the flat surface area 11b of the reflecting substrate 10. Therefore, when each of the substrate materials 11 and 21 basically comprises a flat plate, the difference between the distances TS and TL corresponds to the sum of the difference in height $\Delta t$ and the total thickness of the alignment film 16, the transparent electrodes 22 and the alignment film 23, and thus the difference between the outer diameters of the spacers 32 and 33 may be set to a value equal to the sum of the difference in height $\Delta t$ and the total thickness of the alignment film 16, the transparent electrodes 22 and the alignment film 23.

However, the transparent electrodes 22 have a thickness of as small as about 0.05 $\mu$m as compared with the distance TL of several microns, and like the transparent electrodes 22, each of the alignment films 16 and 23 has a thickness of as small as about 0.05 $\mu$m. Furthermore, the alignment films 16 and 23 are relatively soft and thus pressed by the spacers 33 to substantially further decrease the thickness. Therefore, in this embodiment, even when the difference between the outer diameters of the spacers 32 and 33 equals to the difference in height $\Delta t$, substantially no problem of nonuniformity occurs in the cell gap.

Furthermore, a retardation plate 34 and a polarizer 35 are provided on the outer surface of the counter substrate 20. The retardation plate 34 and the polarizer 35 are preferably adhered in that order to the outer surface of the substrate material 21 of the counter substrate 20.

In this embodiment, the thickness of each of the substrate materials 11 and 21 is 0.3 to 1.2 mm; the step difference $\Delta d$ is 1.3 to 1.5 $\mu$m; the thickness of the reflecting layer 12 is 0.1 to 0.3 $\mu$m; the thickness of the colored layers 13 is 1.0 to 1.2 $\mu$m; the thickness of the protecting layer 14 is 1.8 to 2.2 $\mu$m; the thickness of the transparent electrodes 15 is 0.13 to 0.17 $\mu$m; and the thickness of each of the alignment film 16, the transparent electrodes 22 and the alignment film 23 is about 0.04 to 0.06 $\mu$m. The distance TS (the outer diameter of the spacers 32) is 5.5 to 5.9 $\mu$m, and the distance TL (the outer diameter of the spacers 33) is 3.55 to 3.95 $\mu$m.

Under the above thickness conditions, the roughened state of the roughened surface area 11a preferably has a maximum height Ry of about 1 $\mu$m or less, an arithmetic mean roughness Ra of about 0.1 $\mu$m, and a mean wavelength Sm of about 10 to 20 $\mu$m, and particularly preferably has a mean wavelength Sm of 12 to 13 $\mu$m.

Figure 6:
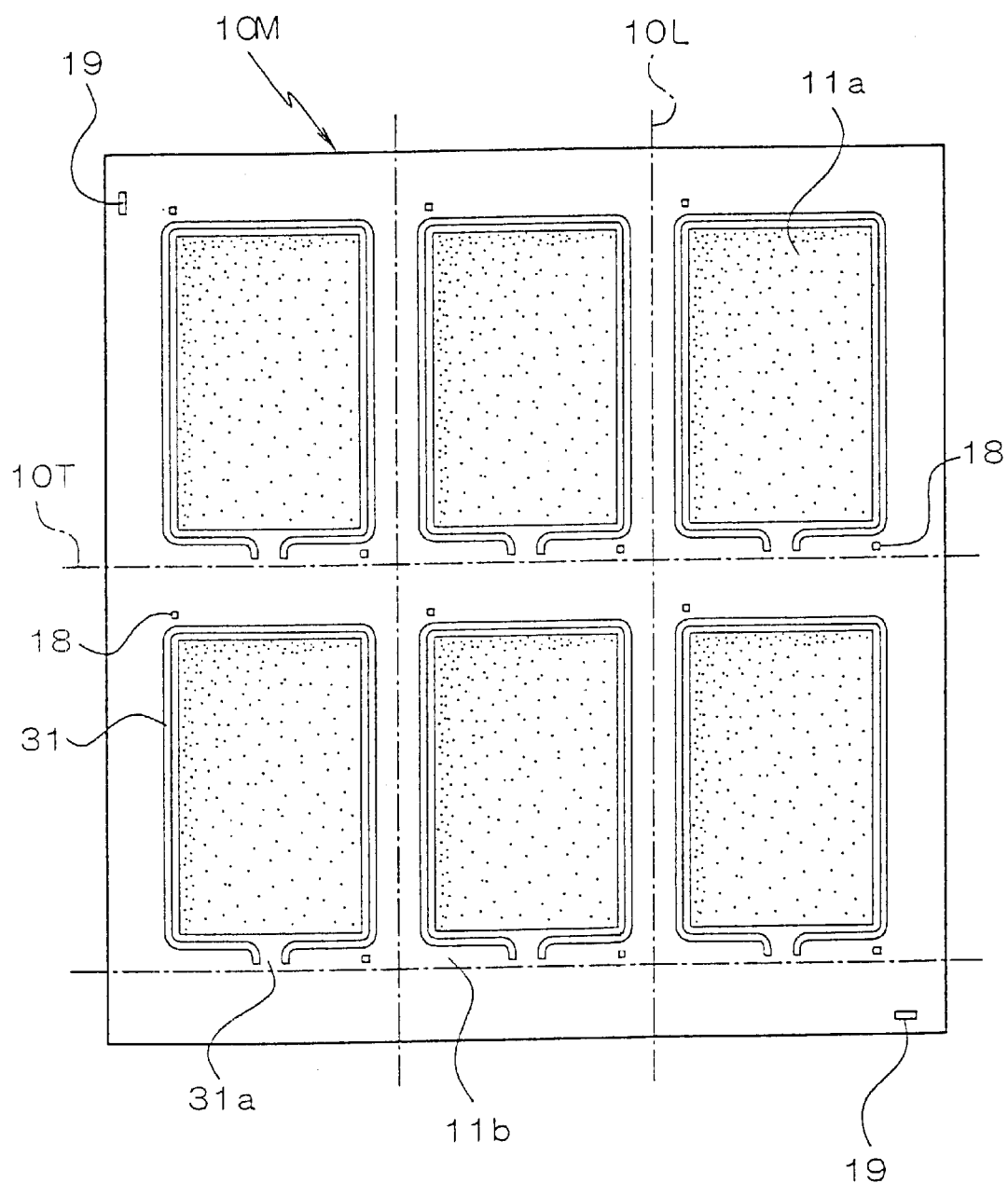
FIG. 6 is a schematic plan view schematically showing the planar structure of a large-size substrate in manufacturing a plurality of liquid crystal display panels of the present invention in a multi-panel system.
Figure 9:
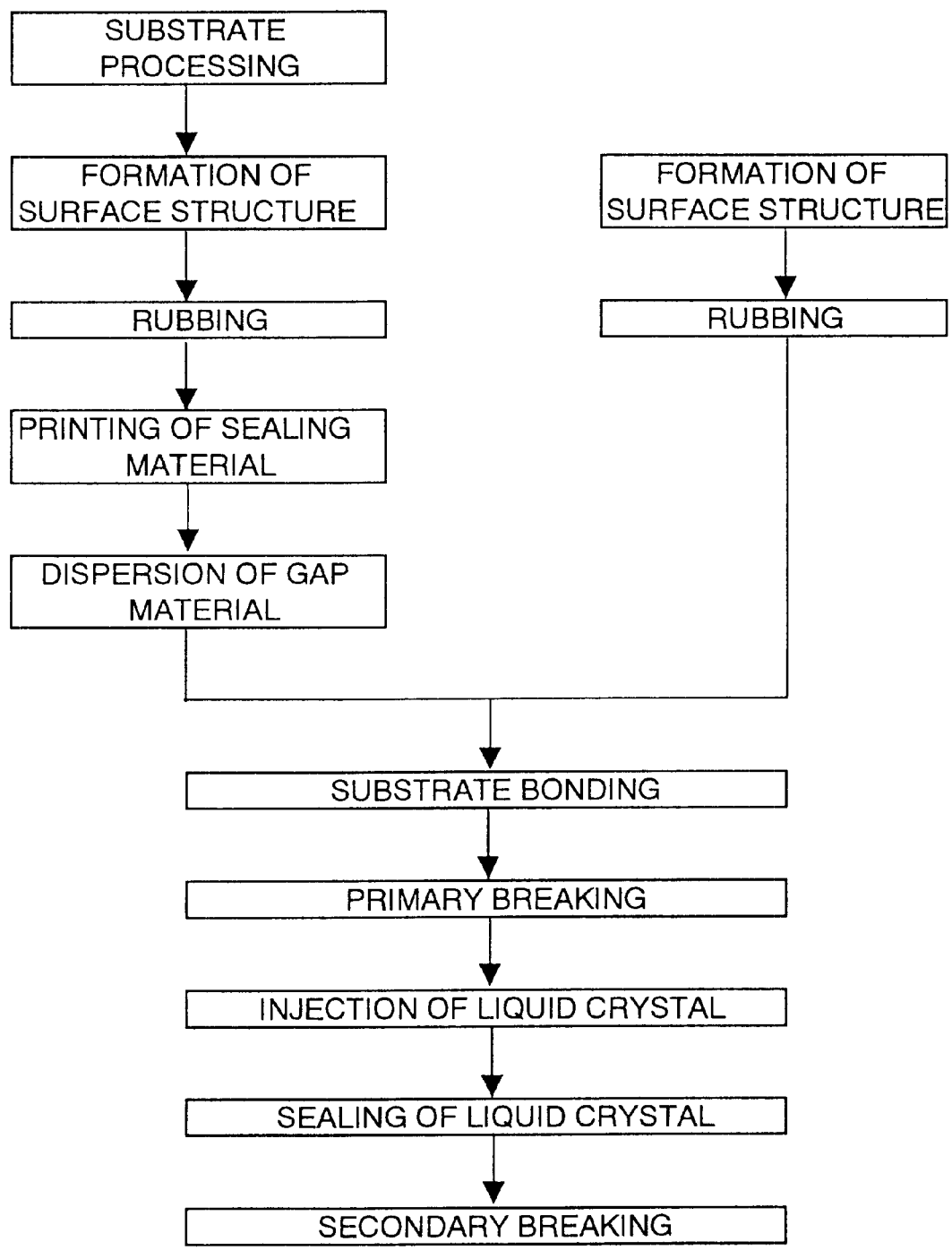
FIG. 9 is a flow chart schematically showing the steps of a multi-panel manufacturing method of the present invention.

FIG. 6 shows the planar structure of a large-size substrate 10M corresponding to a plurality of the reflecting substrates 10 when a multi-panel large-size panel is divided to produce the liquid crystal display panel 100 of this embodiment. FIG. 9 schematically shows the manufacturing process using the large-size substrate 10M.

In the reflecting substrate 10M formed in the multi-panel manufacturing process, the large-size substrate material is subjected to the above-described processing to form a plurality of roughened surface areas 11a on the surface, each of the roughened surface areas 11a being surrounded by the flat surface area 11b. Next, a surface structure comprising the reflecting layer 12, the colored layers 13, the protecting layer 14, the transparent electrodes 15 and the alignment film 16 is formed on each of the roughened surface areas 11a of the substrate material.

Furthermore, alignment marks 18 and 19 used in the manufacturing process, and marks for controlling the process are formed in the flat surface area 11b. Therefore, by forming the marks on the flat surface area 11b, the visibility of the marks can be improved, and the substrate can easily be positioned and discriminated. The marks are preferably formed by using the same material at the same time as the formation of any one of the layers of the surface structure on the surface of the substrate material. For example, the marks are formed by using the same material at the same time as the reflecting layer and the transparent electrodes.

As shown in FIG. 9, the alignment film at the top of the surface structure is rubbed. Then, the sealing material 31 containing the spacers 32 is formed on the flat surface area 11b of the large-size substrate 10M by the printing method (for example, flexo printing) to surround the roughened surface areas 11a. A liquid crystal inlet 31a comprises an opening for injecting the liquid crystal.

Then, the spacers 33 are dispersed on the surfaces of the reflecting substrates 10 so that the spacers 33 are dispersively arranged on the surface structures of the roughened surface areas 11a. Since the spacers 33 have an outer diameter smaller than the spacers 32, even when the spacers 33 are dispersed on the flat surface area 11b and the sealing material 31 during uniform dispersion on the large-size substrate 10M by using a spacer dispersing apparatus not shown in the drawing, the spacers 33 cause no defect in bonding the substrates, i.e., no state in which the thickness TS (refer to FIG. 3) of the sealing material 31 is larger than the outer diameter of the spacers 32 due to the spacers 33.

On the other hand, a large-size counter substrate including a plurality of counter substrates 20 is prepared, and the surface structure comprising the transparent electrodes 22 and the alignment film 23 is formed on the surface of the substrate material. The large-size counter substrate is superposed on the large-size substrate 10M so that the surface having the surface structure formed thereon is opposite to the surface of the large-size substrate 10M, and both substrates are bonded together through the sealing material 31. As a result a large-size panel is formed.

The large-size panel formed by bonding the large-size substrate 10M shown in FIG. 6 and the large-size counter substrate together is divided (primary breaking) into strips by, for example, a scribe and break method along parting lines 10T shown by one-dot chain lines in FIG. 6 to expose the liquid crystal inlets 31a. The liquid crystal is injected through the liquid crystal inlets 31a. Then, the liquid crystal inlets 31a are sealed with an ultraviolet curing resin or the like, and the strips are again divided along the parting lines 10L shown in FIG. 6 to obtain the liquid crystal display panel 100 having the shape shown in FIG. 3.

Although, in this embodiment, the roughened surface area 11a of the reflecting substrate 10 is formed to be lower than the flat surface area 11b by the step difference $\Delta d$, the total thickness of the reflecting layer 12, the colored layers 13 and the protecting layer 14 is made larger than $\Delta d$ so that the distance TL corresponding to the thickness of the liquid crystal 30 in the roughened surface area 11a is smaller than the distance TS corresponding to the thickness of the sealing material 31. Therefore, the outer diameter of the spacers 33 can be set to be smaller than the thickness of the sealing material 31 or the distance TS. As a result, even when the spacers 33 are arranged in the forming portion of the sealing material 31 on the flat surface area 11b or placed on the sealing material 31 during dispersion of the spacers 33, an increase in the distance between the reflecting substrate 10 and the counter substrate 20 is prevented near the forming portion of the sealing material 31. Therefore, in the liquid crystal display panel, uniformity of the cell gap can be improved.

Figure 4:
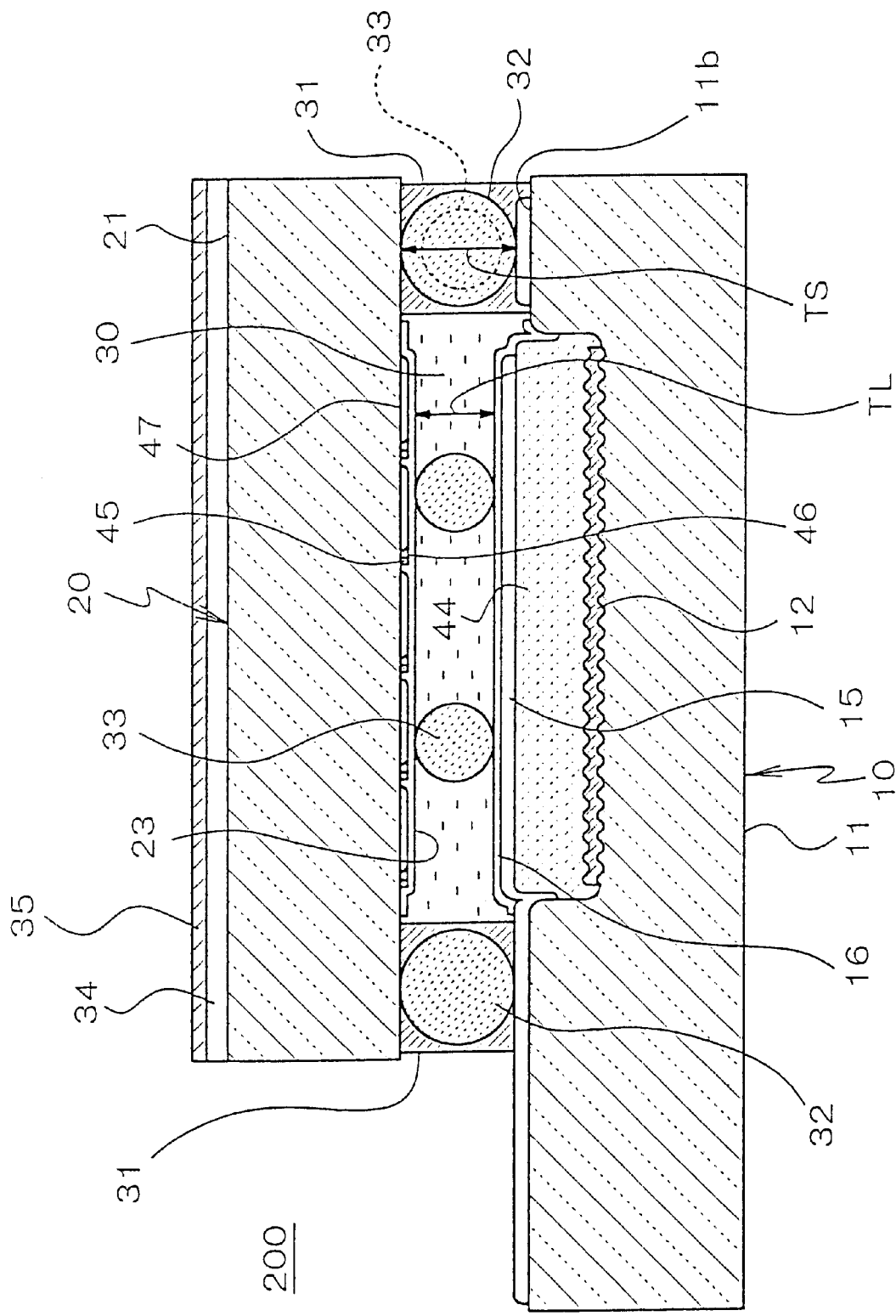
FIG. 4 is a longitudinal sectional view showing the structure of a liquid crystal display panel of a liquid crystal device according to a second embodiment of the present invention.

Next, a liquid crystal device according to a second embodiment of the present invention will be described with reference to FIG. 4. Although a liquid crystal display panel 200 of this embodiment has substantially the same structure as the liquid crystal display panel of the first embodiment, FIG. 4 shows an active matrix monochromatic liquid crystal panel as an example using MIM (metal-insulator-metal) two-terminal nonlinear elements as switching elements. In FIG. 4, the same portions as the liquid crystal display panel of the first embodiment shown in FIG. 3 are denoted by the same reference numerals, and description thereof is omitted.

The same roughened surface area 11a and flat surface area 11b as described above are formed on the reflecting substrate 10, and the same reflecting layer 12 as described above is formed on the surface of the roughened surface area 11a. An insulating layer 44 is formed on the reflecting layer 12. The insulating layer 44 preferably comprises an inorganic hard film such as $SiO_2$, $TiO_2$, or the like, or an acrylic resin. The insulating layer 44 is formed to a thickness of about 1.5 to 2.5 $\mu$m which is larger than the step difference $\Delta d$ (for example, 1.3 to 1.5 $\mu$m) indicating the depth of the reference plane of the roughened surface area 11a from the surface position of the flat surface area 11b. Therefore, the surface of the insulating layer 44 is formed at a position higher than the surface of the flat surface area 11b.

On the other hand, in the counter substrate 20 of this embodiment, a plurality of scanning lines (wiring) 45 made of Ta or the like are formed in parallel on the surface of the substrate material 21 in the direction perpendicular to the transparent electrodes 15. Each of the scanning lines 45 is connected to a counter electrode 47 comprising a transparent conductor such as ITO through a switching element 46 comprising a MIM element or another tow-terminal nonlinear element for each of pixels. The switching element 46 comprises a MIM junction structure comprising a portion of the scanning lines made of, for example, Ta metal, an insulating film composed of $Ta_2O_5$ formed by anodization or the like, and a conductor of Cr or ITO.

Like in the first embodiment, in this embodiment, the surface of the insulating layer 44 is higher than the surface of the flat surface area 11b so that the distance TS equal to the thickness of the sealing material 31 in the flat surface area 11b is larger than the distance TL equal to the thickness of the liquid crystal 30 in the roughened surface area 11a. Therefore, even when the spacers 33 are dispersed on the flat surface area 11b or the sealing material 31, the distance TS is not affected by the spacers 33, and the liquid crystal display panel can be constructed without trouble.

In the above-described structure, the surface structure of the reflecting substrate 10 may be a structure comprising the same color filter as the first embodiment. Although, in this embodiment, the MIM elements as two-terminal nonlinear elements are used as the switching elements, for example, TFT (thin film transistor) as a three-terminal nonlinear element and other appropriate switching elements may be used. Furthermore, in the above structure, the surface structure of the counter substrate 20 may be a passive matrix structure having the same stripe transparent electrodes as the first embodiment.

Figure 5:
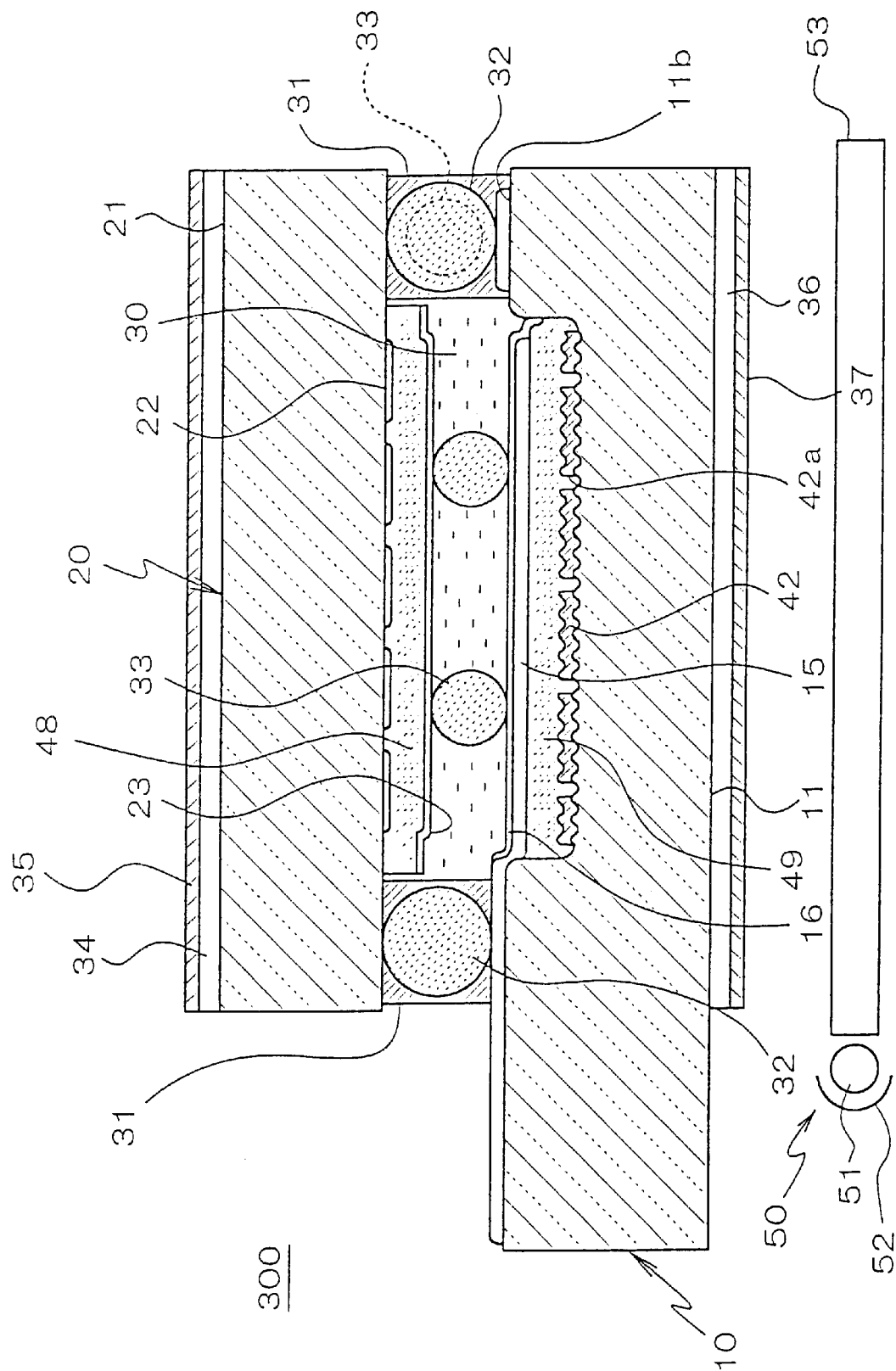
FIG. 5 is a longitudinal sectional view showing the structure of a liquid crystal display panel 300 of a liquid crystal device according to a third embodiment of the present invention.

Next, a liquid crystal device according to a third embodiment of the present invention is described with reference to FIG. 5. A liquid crystal display panel 300 of the third embodiment is a monochromatic liquid crystal panel of the same passive matrix type as the liquid crystal display panel 100 of the first embodiment except that it has a transflective panel structure and is used with a back light 50 provided back of the panel.

In the reflecting substrate 10 of this embodiment, a slit (aperture) 42a is formed in each of pixel areas (the areas at the intersections of the transparent electrodes 15 and the transparent electrodes 22) of a reflecting layer 42 formed on the surface of the roughened surface area 11a. Also, an insulating layer 49 made of the same material as the insulating layer 44 of the second embodiment is formed on the reflecting layer 42. The insulating layer 49 is thinner than the insulating layer 44 of the second embodiment, and consequently, the total thickness of the reflecting layer 42 and the insulating layer 49 is slightly smaller than the step difference $\Delta d$.

On the other hand, in the counter substrate 20, an insulating layer 48 made of the same material as the insulating layer 44 is formed on the same transparent electrodes 22 as the above-described embodiments, and the same alignment film 23 as the above-described embodiments is formed on the insulating layer 48. Alternatively, the transparent electrodes 22 and the alignment film 23 may be formed in that order on the insulating layer 48. The insulating layer 48 is formed to a predetermined thickness so that the total thickness of the reflecting layer 42, the insulating layer 49 and the insulating layer 48 is larger than the step difference Δd.

In this embodiment, in the back light 50, light emitted from a light source 51 such as a LED (light emitting diode) is collected at the end surface of a light guide 53 by a reflection plate 52, introduced into the light guide 53 and then substantially uniformly emitted from the front side of the light guide 53 by means of a light modulation structure of the light guide 53. The light passes through the liquid crystal through the slits 42a of the reflecting layer 42, and travels forward through the counter substrate 20. Therefore, in the liquid crystal display panel of this embodiment, a display can be visualized by external light in the same manner as an ordinary reflective panel, and a display can be seen with light of the back light in the dark.

In this embodiment, the total thickness of the reflecting layer 42 and the insulating layer 49 formed in the roughened surface area 11a is smaller than the step difference Δd. However, the total thickness of the reflecting layer 42, the insulating layer 49 and the insulating layer 48 formed on the counter substrate 20 is larger than the step difference Δd so that the distance TL between the reflecting substrate 10 and the counter substrate 20 corresponding to the thickness of the liquid crystal 30 in the roughened surface area 11a is smaller than the distance TS between the reflecting substrate 10 and the counter substrate 20 in the flat surface area 11b, and the outer diameter of the spacers 33 is smaller than that of the spacers 32 by an amount corresponding to the difference between the distances TS and TL. Therefore, like in the above-described embodiments, even when the spacers 32 are arranged on the flat surface area 11b, no influence occurs on the cell gap.

In the third embodiment, the same color filter as the first embodiment comprising the colored layers and the protecting layer may be used instead of the insulating layer of the reflecting substrate 10. Alternatively, this embodiment may use an active matrix panel structure using the same switching elements as the second embodiment.

An example of the method of processing the reflecting substrate which can be used in each of the above embodiments is described below with reference to FIG. 7. This example uses aluminosilicate glass as a substrate material.

FIG. 7(a) schematically shows an enlarged sectional structure of a substrate material 110. The substrate material 110 comprises a first component 111 formed in a network shape, and a second component 112 present to fill the meshes of the first component 111. The first component 111 comprises, for example, a copolymer of silicic acid and aluminum oxide, and the second component 112 comprises, for example, magnesium oxide.

First, the surface of the substrate material 110 is etched for cleaning.

Specifically, the substrate material 110 is dipped in a hydrofluoric acid aqueous solution, for example, of about 5 wt % and 25° C. for 5 seconds.

Next, as shown in FIG. 7(b), a predetermined mask material 170 is formed at a predetermined position on the surface of the substrate material 110. The mask material 170 comprises photoresist, any of various resins, a film, or the like. Then, the substrate material 110 is dipped in a supersaturated solution of aluminum oxide and magnesium oxide in a 30 wt % hydrofluoric acid aqueous solution at 25° C. for 30 seconds.

This treatment precipitates aluminum oxide of the supersaturated solution in the portions where aluminum oxide of the network-shaped first component 111 is localized, and precipitates magnesium oxide of the supersaturated solution in the portions where magnesium oxide of the second component 112 is localized. The network structure 113 shown in FIG. 7(c) is composed of the aluminum oxide and magnesium oxide.

On the other hand, the portions of the substrate material 110, which are composed of components not supersaturated in the treatment solution, i.e., components other than the aluminum oxide and magnesium oxide, are corroded with hydrofluoric acid contained in the treatment solution. As a result, troughs 114 are formed in the portions of the substrate material 110 other than the portions where the network structure 113 is formed.

The above-described etching treatment is simply referred to as a "first roughening step" hereinafter. In this step, for example, the surface of the substrate material 110 is roughened to form a roughened surface having, for example, a depth of about 0.5 μm from the surface, an arithmetic mean roughness of about 0.04 μm, and a mean wavelength Sm of about 3 μm. In the first roughening step, the surface may be roughened by spraying a fine abrasive powder using the mask material 170 and a metal mask instead of the above-described method. The grain size and material of the abrasive powder and the spraying pressure are appropriately selected to obtain the above-described desired surface roughness.

Next, as shown in FIG. 7(d), the mask material 170 is removed. The mask material 170 can be appropriately removed according to the material of the mask material, and for example, the mask material 170 comprising photoresist can be easily removed with an alkali aqueous solution.

Next, the entire surface of the substrate material 110 from which the mask material 170 is removed as described above is subjected to wet etching. For example, the substrate material 110 is dipped in a solution containing 50 wt % hydrofluoric acid and a 40 wt % ammonium fluoride aqueous solution at a weight ratio of 1:3 at 25° C. for about 20 seconds. This treatment removes the network structure 113 and makes uniform the fine protrusions formed between the troughs 114 to form the roughened surface area 11a in which smooth peaks and troughs are irregularly arranged. On the other hand, the portion of the substrate material 110 covered with the mask material 170 becomes the flat surface area 11b. In this step, a roughened surface having a depth of 1.3 to 1.5 μm, an arithmetic mean roughness Ra of 0.07 to 0.1 μm, and a mean wavelength Sm of 10 to 15 μm is formed.

This treatment is simply referred to as "second roughening" hereinafter. The second roughening may be performed by chemical polishing using a polishing apparatus using the above solution as a treatment solution. This permits the formation of the good roughened surface area 11a while maintaining the flatness of the flat surface area 11b in the portion of the surface from which the mask material 170 is removed.

The first roughening and the second roughening are alternately performed by different methods under different conditions (for example, the presence of the mask 170, differences in the components of the etchant used) to form the roughened surface area 11a having the above-described appropriate surface roughness (maximum roughness Ry, arithmetic mean roughness Ra, ten-point mean roughness Rz, and mean wavelength Sm). Particularly, the irregular network structure 113 and the troughs 114 matching with the network structure 113 are formed in the first roughening, and the entire substrate material 110 is etched in the second roughening to remove the network structure 113 and form a smooth irregular structure based on the troughs 114. Therefore, visible light can be appropriately scattered by the roughened surface having a proper irregularity height and irregularity period as a whole, and coloring of a display image of the liquid crystal panel can be prevented by the irregular uneven structure.

This method comprises the first roughening with the mask material 170 formed, and the second roughening after the mask 170 is removed, and can thus decrease the step difference Δd between the reference plane of the roughened surface area 11a and the surface of the flat surface area 11b, which is necessary for obtaining the desired surface roughness. The step difference Δd is preferably in the optimum range of 1.0 to 2.0 μm, more preferably 1.3 to 1.5 μm. With a step difference Δd less than the above range, it is difficult to form the roughened surface area 11a with good surface roughness, and thus coloring of a display image or reflection of a background or illumination occurs due to the poor roughness state of the reflecting plane to decrease visibility. With a step difference Δd of over the above range, the surface structure of the reflecting substrate is inevitably increased to deteriorate the production efficiency.

Figure 8:
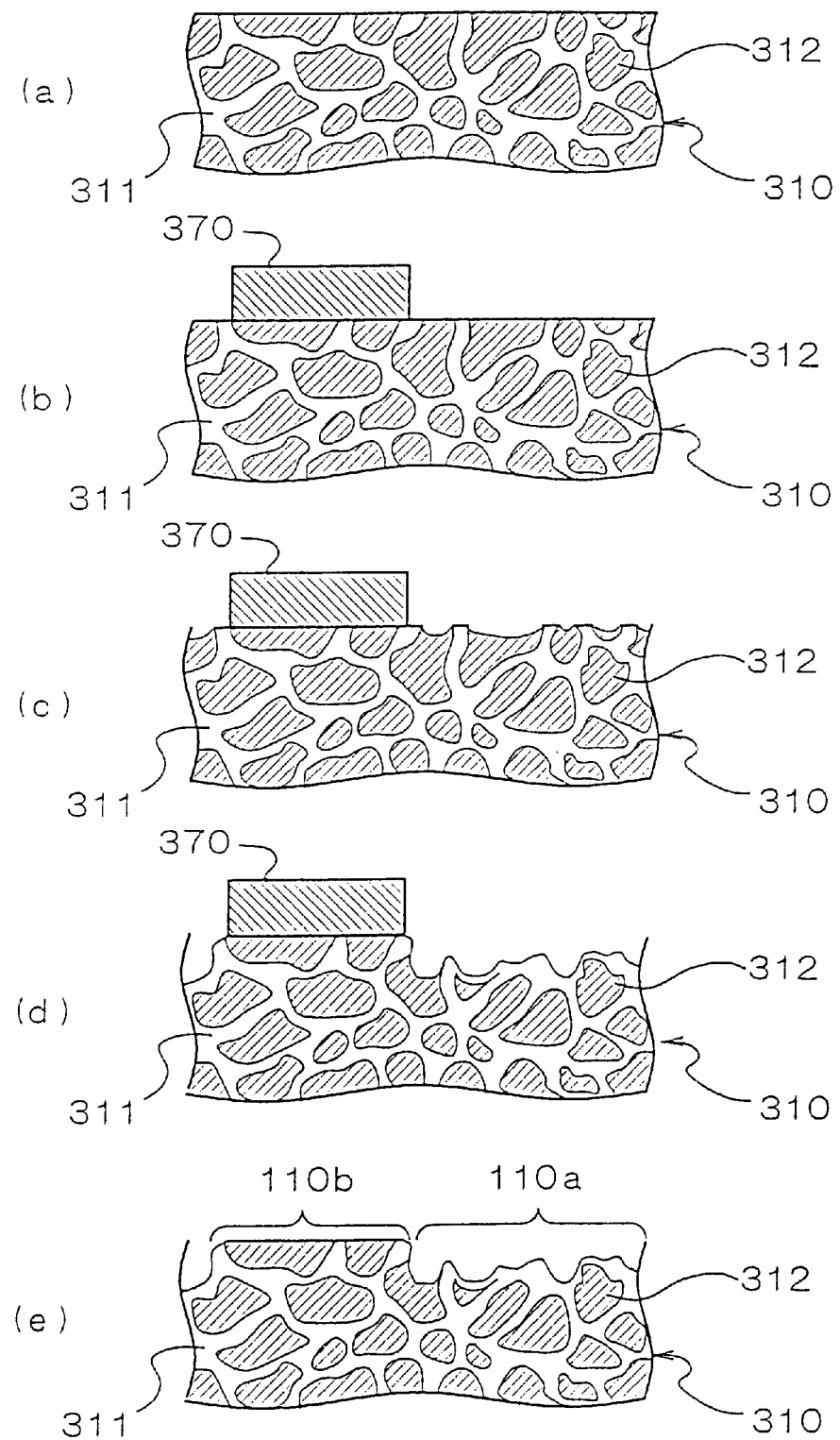
FIGS. 8(a) to (e) are drawings illustrating the steps of another method of processing a reflecting substrate of a liquid crystal panel of the present invention.

Next, another example of the method of processing the reflecting substrate is described with reference to FIG. 8. This example uses soda lime glass for a substrate material 310.

Figure 7:
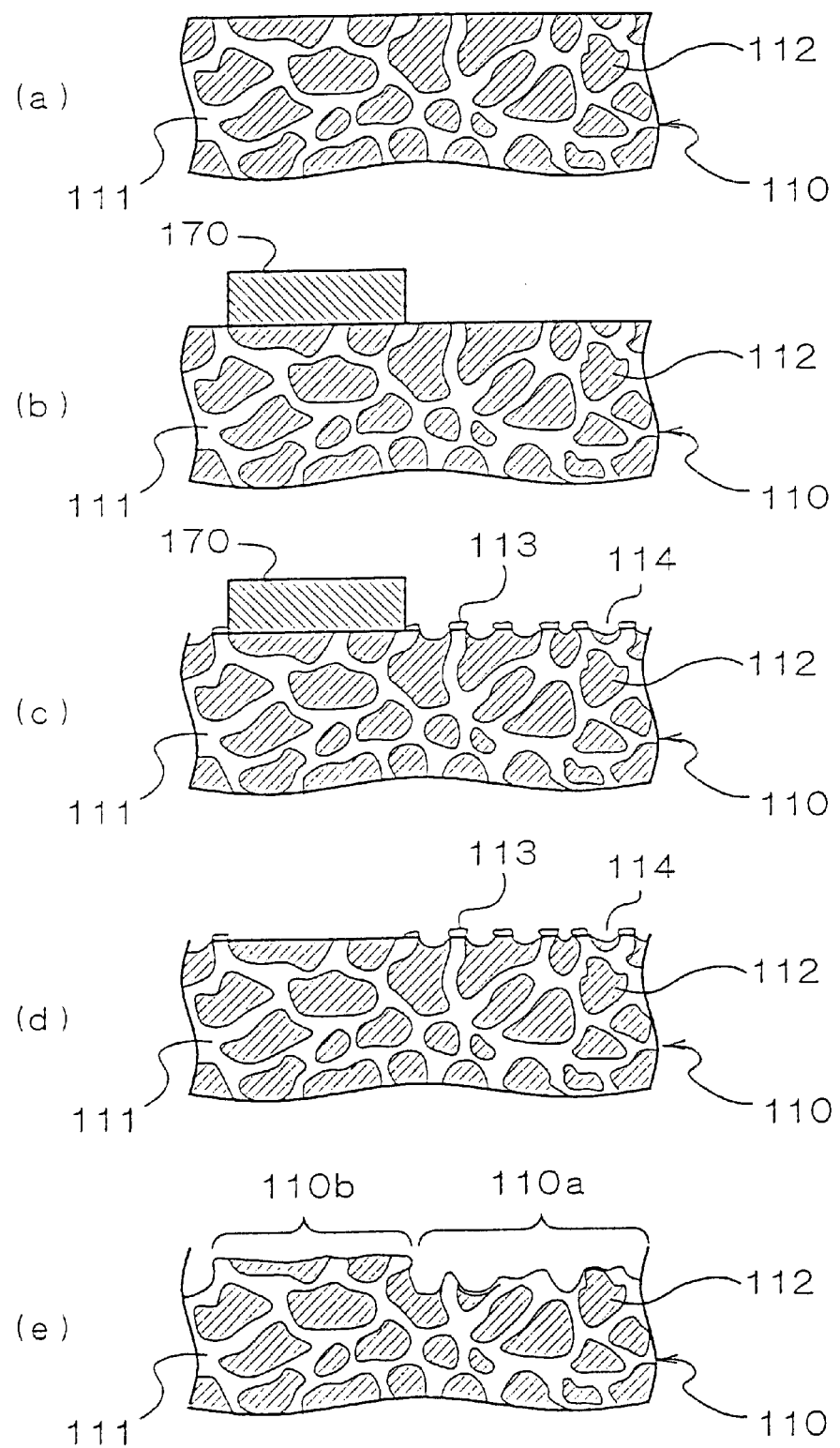
FIGS. 7(a) to (e) are drawings illustrating the steps of a method of processing a reflecting substrate of a liquid crystal display panel the first embodiment.

As shown in FIG. 8(a), like in the above-described substrate material shown in FIG. 7, the substrate material 310 comprises a network-shaped first component 311, and a second component 312 present to fill the meshes of the first component 311. In the substrate material 310, the first component 311 comprises silicic acid, and the second component 312 comprises an alkali metal and an alkali earth metal.

First the surface of the substrate material 310 is etched for cleaning. Specifically, the substrate material 310 is dipped in a 5 wt % hydrofluoric acid aqueous solution at 25° C. for about 5 seconds. Next, as shown in FIG. 8(b), the same mask material 370 as shown in FIG. 7 is formed on the surface of the substrate material 310.

Next, the substrate material 310 is dipped in a treatment solution containing 30 wt % hydrofluoric acid and 45 wt % ammonium hydrogen difluoride at 25° C. for 15 seconds. As shown in FIG. 8(c), the rate of dissolution of the second component 312 with the treatment solution is higher than that of the first component 311. As a result, dipping in the treatment solution forms an irregular structure with predetermined surface roughness on the surface of the substrate material 310, in which peaks corresponding to the first component 311 and troughs corresponding to the second component 312 are arranged, as shown in FIG. 8(d).

An electronic device comprising the above-described liquid crystal display panel according to an embodiment of the present invention is described.

Figure 10:
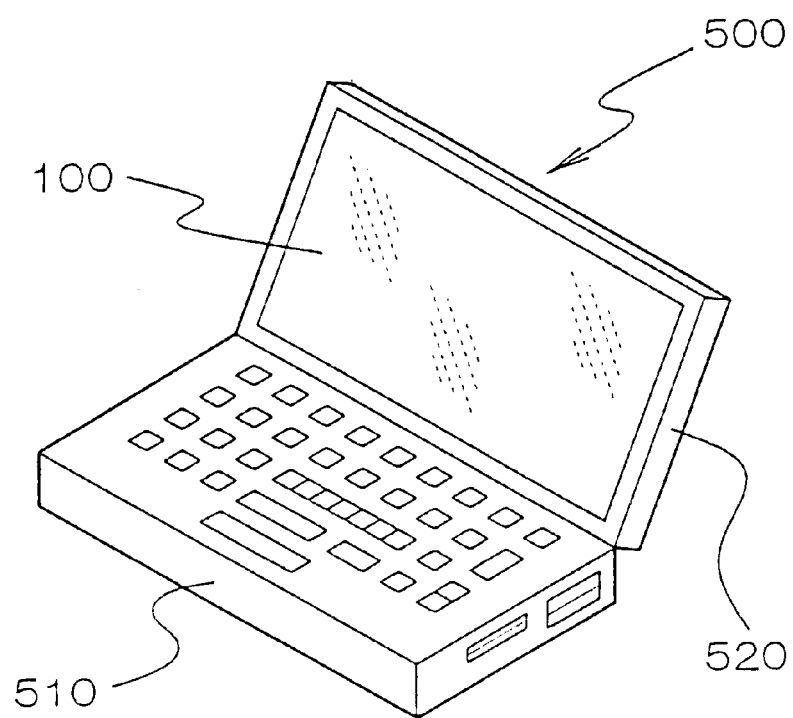
FIG. 10 is a schematic perspective view showing an example of an electronic device containing a liquid crystal device of the present invention.

FIG. 10 shows a portable information terminal 500 as an example of an electronic device containing the liquid crystal display panel of any one of the above embodiments. The information terminal 500 comprises a body section 510 containing a microprocessor unit, a storage unit and a communication unit, and a display section 520 rotatably mounted on the body section 510. The body section 510 comprises various input terminals and a keyboard.

The display section 520 contains the liquid crystal display panel 100 (200 or 300) of any one of the above embodiments. Therefore, an appropriate image is displayed on the display plane of the liquid crystal display panel 100 according to an image signal input from the body section 510.

Although the present invention can be applied to any desired electronic device, particularly the above-described liquid crystal display panel is preferably used for various portable electronic devices such as the information terminal, a cell phone, a pager, a wrist watch, a desk calculator, etc., and movable electronic devices.

An electro-optical device and electronic device of the present invention are not limited to the above described embodiments, and various changes can be made within the gist of the present invention.

For example, a structure (a surface structure comprising a color filter and an insulating layer) for canceling the step difference Δd of a reflecting plate to make the thickness of a sealing material larger than the cell gap is not limited to the above-described structures, a structure can be formed with an appropriate composition, structure and dimensions within a range causing no problem in an operation of a liquid crystal device.

As described above, in the present invention, the distance between two substrates in a roughened surface area formed on the surface of one of the substrates can be made equal to or smaller than that in a flat surface area, thereby easily obtaining uniformity in the distance between the substrates on the reflecting layer side of a liquid crystal device. Also, a difference in height between the roughened surface area and the flat surface area can be freely set, and thus the roughened surface area having preferred surface roughness can be easily realized. The entire Disclosure of Japanese Patent Application No. 2000-257890 filed on Aug. 28, 2000 is incorporated by reference.

What is claimed is:

1. A liquid crystal device comprising:

a liquid crystal sandwiched between two substrates;

a roughened surface area and a flat surface area formed on a surface of one of the substrates opposite the other substrate; and a reflecting layer formed on the roughened surface area;

wherein a reference plane of the roughened surface area is lower than a surface of the flat surface area; and a total thickness of a surface structure selectively formed on the roughened surface area of the one of the substrates and a surface structure selectively formed on an area of the other substrate opposite to the roughened surface area is equivalent to or larger than a step difference between the reference plane of the roughened surface area and the surface of the flat surface area.

2. The liquid crystal device according to claim 1, wherein the two substrates are bonded together through a sealing material, and first regulation means is arranged inboard of the sealing material for regulating a distance between the substrates, a regulation dimension of the regulation means being smaller than a thickness of the sealing material.

3. The liquid crystal device according to claim 2, wherein the sealing material includes second regulation means therein for regulating the thickness thereof.

4. A liquid crystal device comprising:
- a liquid crystal sandwiched between two substrates;
- a roughened surface area and a flat surface area formed on a surface of one of the substrates opposite the other substrate; and
- a reflecting layer formed on the roughened surface area;
- wherein a reference plane of the roughened surface area is lower than a surface of the flat surface area; and
- a predetermined surface structure is formed on the one of the substrates so that the surface of the substrate including the surface structure in the roughened surface area is equivalent to or higher than a surface of the flat surface area.

5. The liquid crystal device according to claim 4, wherein the two substrates are bonded together through a sealing material, and first regulation means is arranged inboard of the sealing material for regulating a distance between the substrates, a regulation dimension of the regulation means being smaller than a thickness of the sealing material.

6. The liquid crystal device according to claim 5, wherein the sealing material includes second regulation means therein for regulating the thickness thereof.

7. A liquid crystal device comprising:
- a liquid crystal sandwiched between two substrates;
- a roughened surface area and a flat surface area formed on a surface of one of the substrates opposite the other substrate; and
- a reflecting layer formed on the roughened surface area;
- wherein a reference plane of the roughened surface area is lower than a surface of the flat surface area;
- a colored layer and a protecting layer are laminated on the reflecting layer, or an insulating layer is formed on the reflecting layer; and
- a total thickness of the reflecting layer, the colored layer and the protecting layer, or a total thickness of the reflecting layer and the insulating layer is equivalent to or larger than a step difference between the reference plane of the roughened surface area and the surface of the flat surface area.

8. The liquid crystal device according to claim 7, wherein the two substrates are bonded together through a sealing material, and first regulation means is arranged inboard of the sealing material for regulating a distance between the substrates, a regulation dimension of the regulation means being smaller than a thickness of the sealing material.

9. The liquid crystal device according to claim 8, wherein the sealing material includes second regulation means therein for regulating the thickness thereof.

10. A liquid crystal device comprising:
- two substrates bonded together with a sealing material provided therebetween; and
- a liquid crystal arranged inboard of the sealing material;
- wherein a roughened surface area and a flat surface area are formed on a surface of one of the substrates opposite the other substrate so that a reference plane of the roughened surface area is lower than a surface of the flat surface area;
- a reflecting layer is formed on the roughened surface area;
- the sealing material is arranged on the flat surface area; and
- a thickness of the sealing material is equivalent to or larger than a thickness of the liquid crystal layer in the roughened surface area.

11. The liquid crystal device according to claim 10, wherein first regulation means is arranged inboard of the sealing material for regulating a distance between the substrates, and a regulation dimension of the regulation means is smaller than the thickness of the sealing material.

12. The liquid crystal device according to claim 11, wherein the sealing material includes second regulation means therein for regulating the thickness thereof.

13. A method of manufacturing a liquid crystal device including a liquid crystal sandwiched between two substrates comprising:
- forming a roughened surface area and a flat surface area on a surface of one of the substrates opposite the other substrate so that a reference plane of the roughened surface area is lower than a surface of the flat surface area;
- selectively forming a surface structure on the roughened surface area of the one of the substrates and a surface structure on an area of the other substrate opposite the roughened surface area so that a total thickness of the surface structures is equivalent to or larger than a step difference between the reference plane of the roughened surface area and the surface of the flat surface area; and
- bonding the two substrates together with a sealing material arranged on the flat surface area.

14. The method of manufacturing a liquid crystal device according to claim 13, further comprising the step of covering a portion of one of the substrates with a mask, roughening an exposed portion of the substrate, and then removing the mask to form the roughened surface area and the flat surface area.

15. The method of manufacturing a liquid crystal device according to claim 14 further comprising the step of further processing the roughened surface area by another step to change a shape of surface irregularities in the roughened surface area after the roughening step.

16. The method of manufacturing a liquid crystal device according claim 13, wherein first regulation means is arranged on one of the substrates for regulating a distance between the substrates, and the two substrates are bonded together through a sealing material, a thickness of the sealing material being larger than a regulation dimension of the first regulation means.

17. The method of manufacturing a liquid crystal device according to claim 16, wherein the sealing material includes a second regulation means therein with a regulation dimension larger than the first regulation means, and the two substrates are bonded together through the sealing material having a thickness regulated by the second regulation means.

18. A method of manufacturing a liquid crystal device including a liquid crystal sandwiched between two substrates comprising:
- forming a roughened surface area and a flat surface area on a surface of one of the substrates opposite the other substrate so that a reference plane of the roughened surface area is lower than a surface of the flat surface area;
- forming a surface structure on each of the roughened surface area of the one of the substrates and an area of the other substrate opposite the roughened surface area; and
- bonding the two substrates together with a sealing material arranged on the flat surface area so that a thickness of the sealing material is equivalent to or larger than a thickness of the liquid crystal layer in the roughened surface area.

19. The method of manufacturing a liquid crystal device according to claim 18, further comprising the step of covering a portion of one of the substrates with a mask, roughening an exposed portion of the substrate, and then removing the mask to form the roughened surface area and the flat surface area.

20. The method of manufacturing a liquid crystal device according to claim 19, further comprising the step of further processing the roughened surface area by another step to change a shape of surface irregularities in the roughened surface area after the roughening step.

21. The method of manufacturing a liquid crystal device according claim 18, wherein first regulation means is arranged on one of the substrates for regulating a distance between the substrates, and the two substrates are bonded together through a sealing material, a thickness of the sealing material being larger than a regulation dimension of the first regulation means.

22. The method of manufacturing a liquid crystal device according to claim 21, wherein the sealing material includes a second regulation means therein with a regulation dimension larger than the first regulation means, and the two substrates are bonded together through the sealing material having a thickness regulated by the second regulation means.

* * * * *

UNITED STATES PATENT AND TRADEMARK OFFICE
CERTIFICATE OF CORRECTION

PATENT NO.   : 6,650,395 B2
DATED        : November 18, 2003
INVENTOR(S)  : Mutsumi Matsuo It is certified that error appears in the above-identified patent and that said Letters Patent is hereby corrected as shown below:

Title page,
Item [75], Inventors, delete "Suwa (JP)" and insert -- Minamiazumi (JP) -- therefor
Item [56], References Cited, FOREIGN PATENT DOCUMENTS, "JP 8-160464" should be -- JP 8 160462 --

Column 4,
Line 13, "potable" should be -- portable --
Line 27, "lager" should be -- larger --

Column 5,
Line 37, after "panel" insert -- of -- therefor

Column 6,
Line 52, "form" should be -- from --

Column 12,
Line 19, "tow-terminal" should be -- two terminal --

Column 18,
Line 38, after "according" insert -- to -- therefor

Signed and Sealed this

Twenty-fifth Day of May, 2004

JON W. DUDAS
*Acting Director of the United States Patent and Trademark Office*